April 21, 1970  F. SCHNEIDER ET AL  3,508,133
METHOD AND APPARATUS FOR CONTROLLING THE
OVERRUN OF ROTARY MEMBER Filed April 26, 1966  2 Sheets-Sheet 1

INVENTORS
FRANZ SCHNEIDER
EUGEN WALLER
HANS HAUGER

BY  Dicke + Craig
ATTORNEYS

INVENTORS
FRANZ SCHNEIDER
EUGEN HALLER
HANS HAUSER

BY Dicke + Craig
ATTORNEYS 3,508,133
METHOD AND APPARATUS FOR CONTROLLING
THE OVERRUN OF ROTARY MEMBER
Franz Schneider, Eugen Waller, and Hans Hauser,
Goppingen, Germany, assignors to L. Schuler G.m.b.H.,
Goppingen, Germany
Filed Apr. 26, 1966, Ser. No. 545,498
Claims priority, application Germany, Apr. 29, 1965,
Sch 36,959
Int. Cl. H02p 1/00, 3/00
U.S. Cl. 318—275                        15 Claims

ABSTRACT OF THE DISCLOSURE

Method and apparatus for adjusting the angular position of a rotating shaft at which said shaft is caused to stop including means for measuring the rotary speed of the shaft during a fractional portion of a cycle thereof and means for varying the angular position at which the brake is made operative automatically as a function of the measured speed including means for adjusting for the overrun of the previous operation.

---

Figure 1:
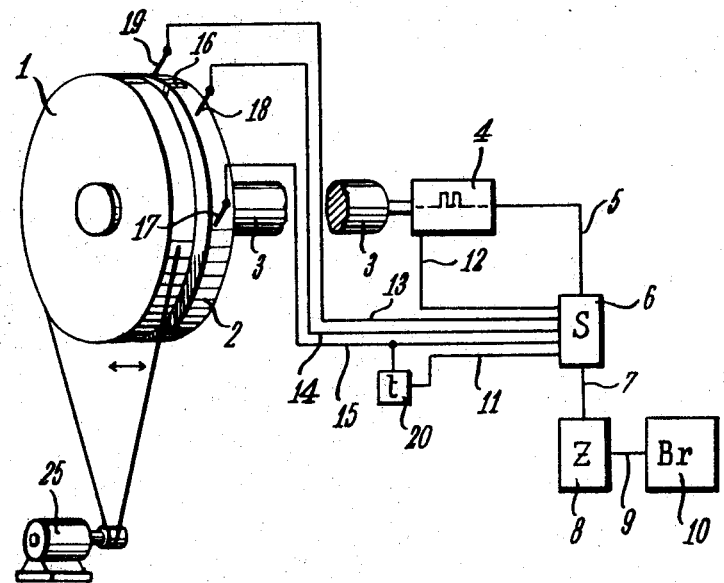

The present invention relates to a method and apparatus for controlling the overrun of a rotary member, the stopping of which is controlled by braking means, and particularly to controlling the main driving shaft of a press by regulating the operation of the braking means in such manner that the shaft, and hence the press, comes to rest at a predetermined standard or reference position, hereinafter termed the "nominal" position.

Frequently, it is important that the press comes to a standstill with the main driving shaft in an exactly defined position, for example when a safety device permits access to the tools only in a definite position of the press or when following machines or other apparatus are controlled by the press, the rest position of which is directly related to the rest position of the primary press. Also in the case of presses incorporating operating links or levers it is frequently desirable that the press comes to a standstill with the links or levers in definite relative positions in order that unfavorable stresses are avoided, such as may occur on starting the press if the links, levers and joints are in a geometrically unfavorable position and the links with their relatively large mass must be accelerated rapidly. Modern presses can always be operated at different stroke speeds. When such presses are stopped the overrun period and thus the overrun movement vary in length depending upon the stroke speed at which the press is operated. Also other effects, for example the state of the brake and the momentary pressure of the pressure means pressing the braking surfaces against each other affect the length of the overrun movement.

The invention is directed to providing a device which is as simple as possible, which however operates quickly and reliably and ensures that the overrun movement is determined and adjusted automatically in such manner that the press comes to a standstill always in an exactly defined nominal position.

The invention consists in that for determining the actual stroke speed, the main driving shaft operates a pulsing switch device over a fractional part of the stroke movement, which device emits pulses which are fed to a pulse counter for a given time period under the control of a timing device, so that the number of pulses counted is representative of the measured speed, and the angular position at which the brake is made operative is automatically varied as a function of the measured speed.

The pulsing switch device emits a given number of pulses during each revolution of the main driving shaft and may be of the contactless type, for example of the photoelectric type in which the pulses are produced by interruption of a light path or of the electromagnetic type in which the pulses are produced in an inductor coil.

The particular advantage of the apparatus according to the invention is that for each change of the stroke speed of the press the overrun movement of the movable parts is also adjusted afresh automatically. In particular when the stroke speed of a press must be altered frequently this advantage facilitates considerably the operation of the press. In the arrangement of the invention the measurement of the speed is effected over a fractional portion of the stroke movement and hence it is possible first to measure the stroke speed during a single stroke and then to adjust the overrun movement during the same stroke.

The predetermined function of the measured speed by means of which the angular value of the overrun movement is adjusted may be a simple mathematical function of the speed or may be a nonlinear function, for example a quadratic function of any empirical function. The means at which the braking process is started may also be constructed in dependence upon the character of the function by which a certain overrun movement is related to the speed determining the rotary position. These means may be for example cam discs or the like the position of which is adjusted in accordance with the stroke speed and the cam face of which cooperates with transfer members which determine directly the angular position of the main driving shaft in which the braking process is started and which thus adjust for example a control device disposed on the periphery of the main driving shaft for initiating the braking process or otherwise displaces a control device which is displaceable along the path of a cam rotating together with the driving shaft.

Also mechanically scanned curves or any calculating mechanism may determine the position of the driving shaft in which the braking process is started.

The means which effect the adjustment of the overrun movement may simultaneously serve also for other purposes, for example for the measurement of the stroke speed. In such an embodiment of the invention a counter device is adjustable so that a certain counted total can be preset which is greater than the number of pulses arriving during the speed measurement, and after the completion of the fractional portion of the stroke movement necessary for measuring the speed, the counter device is connected again to the pulse source in a certain angular position of the driving shaft, the counter device having a control device which is connected to a starting device for the brake and which responds when the preset pulse number has been attained.

In this embodiment of the invention which is particularly suitable for automatic adjustment and control and which is very simple, a fixed number of synchronising pulses is produced by the pulse source during each rotation of the driving shaft, for example 1,000, 5,000, 10,000 pulses or even more. Such synchronising pulses are fed to the counter device for a fixed period of time for measuring the respective stroke speed. The number of synchronising pulses arriving at the counter device during this period of time is exactly proportional to the stroke speed of the press. After the period of time determined by the timing member has expired, the delivery of synchronising pulses to the counter device is temporarily interrupted but is continued again when a certain rotary position of the driving shaft has been attained which however does not coincide with the rotary position in which the braking process is started. Thus from this instant onwards synchronising pulses are delivered again to the counter device.

However, as stated already, the counter device is preset to a counted total which is greater than the number of pulses arriving during the speed measurement. The number of pulses which can be accepted by the counter device after the speed measurement is therefore dependent upon the number of pulses previously delivered to the counter device during the speed measurement. When the preset counted total in the counter device has been attained the counter device initiates the braking process. Thus when during the speed measurement many pulses have arrived in the counter device in consequence of a high stroke speed during the period of time determined by the rundown of the timing device, the number of pulses which can still be inserted into the counter device before the preset total is attained, is relatively small. Thus the angle is also small through which the driving shaft rotates between the position in which the synchronising pulses are applied again to the counter device and the position in which the braking process is initiated by the counter device.

If, however, the stroke speed is low the number of synchronising pulses which is stored in the counter device during the rundown of the timing device is also small. Therefore when synchronising pulses are delivered again to the counter device upon the driving shaft passing through the above-mentioned position, there is still room in the counter device for more synchronising pulses before the preset counted total is attained. The angle through which the driving shaft rotates before the braking process is initiated by the counter device is therefore greater than at a high stroke speed. Thus the faster the press operates the more pulses are delivered into the counter device with the first supply of synchronising pulses during the speed measurement, and the earlier the machine is switched off during the second supply.

The invention is also concerned with the case that the nominal position of the driving shaft is not attained exactly when the press comes to a standstill. The invention therefore relates further to a method of adjusting the overrun movement occurring when the press is brought to rest, wherein the magnitude of the overrun movement is adjusted in accordance with a directly preceding measurement of the stroke speed. The method according to the invention provides that in case a defective determination of the overrun movement occurs, the magnitude and sign of the deviation of the angular position of the shaft when the press is at a standstill from the nominal position are determined and that thereupon the associated angular position at which the braking process was started during the preceding stroke, is corrected in accordance with this deviation.

A particular advantage of the method according to the invention resides in the fact that all effects which have an influence on the overrun movement (braking path) are reliably taken into account without an exact knowledge of the magnitude of the effects being necessary. A further advantage of this method resides in the fact that the measure by which the position actually attained during the first stroke differs from the position in which the press is required to be at rest, can be read off directly in terms of a rotary angle of the driving shaft, and that without any further calculation this difference can be used for correcting the angular position of the operating shaft in which braking is started. In no case is a second correction necessary, provided the braking values are not altered again. A further advantage resides in the fact that the choice of the angular position of the driving shaft in which the braking process is to be started during the first press stroke is not at all critical. For example it is sufficient that, as described above, the overrun movement for the first press stroke is proportional in some way to the stroke speed, although the overrun movement is certainly not a linear function of the stroke speed.

When the speed measurement is carried into effect by means of the above described apparatus wherein the synchronising pulses are delivered to a counter device within a fixed period of time the method according to the invention can be developed further in that those synchronising pulses which are produced by the shaft between its passage through the nominal position and the standstill position or, in the case of premature standstill of the press ahead of the nominal position, those synchronising pulses which are produced by the shaft after it has been set into motion again and until it attains the nominal position are fed to the counter device as correction values. Thus, if at a first stroke the press comes to standstill before the nominal position is attained, the synchronising pulses which are produced after restarting the press are applied negatively to the counter device so that during a second stroke the counter device is switched off later in accordance with this number of pulses. Thereby the braking process is started later by exactly the rotary angle which corresponds to the counted correcting pulses, and at the second stroke the press comes to standstill exactly in the nominal position. If at the first stroke the press comes to a standstill beyond the nominal position of the driving shaft, the pulses which are produced while the driving shaft travels through the angle between the nominal position and the position in which the press actually comes to standstill, are inserted positively into the counter device, whereby the counter device attains the preset counted total earlier by this pulse number, the braking signal is obtained earlier by exactly this correction value, and the braking process is started earlier by a rotary angle which corresponds to this correction value, so that after the second and subsequent strokes the press comes to standstill exactly in the nominal position. In order that this correction is equally taken into account for the subsequent strokes, the respective counted total to which the counter is preset is changed automatically in accordance with these correcting pulses.

The synchronising pulses delivered by the pulse source may be produced in a manner known for machine tools, for example photoelectrically by means of a slotted disc, or by means of an electromagnetic pulse source or the like. The means by which the synchronising pulses are delivered into the counter device and are switched off again may also be constructed in any manner for example electrical contacts or switching means operating without physical contact, hereinafter referred to as contactless switching devices may be provided at the periphery of the driving shaft, or a disc rotating synchronously therewith, which by way of logic circuits effect delivery and nondelivery of the synchronising pulses to the counter device. The invention relates therefore also to modifications of the above-mentioned apparatus according to the invention by means of which the method described above can also be performed.

In one embodiment of the apparatus according to the invention there is disposed on the driving shaft or on a disc connected thereto a moving contact device for sources of control signals, and the fixed contacts cooperating with the moving contacts are disposed at stationary locations along the periphery of the shaft or disc, wherein a first signal contact is disposed so that a control signal is delivered in the nominal position of the shaft, a second signal contact is disposed so that its distance from the nominal position corresponds to an overrun movement which is longer than the expected overrun movement, and that a third signal contact is disposed in a position in which the measurement of the stroke speed is to begin.

In a further development of the invention it may be advantageous to derive a control signal which is delivered when the driving shaft is set into motion and a control signal which is delivered when the driving shaft has come to standstill from the pulse source which rotates at a rotational speed which is exactly proportional to the rotary speed of the driving shaft.

The control signal which starts the speed measurement, sets the timing device into operation and conducts the pulses to the counter device, and which is derived from a certain angular position of the driving shaft, may be produced alternatively by other switching or contact means than the above-mentioned contactless switching device. The same applies to the control signal which indicates the passage of the machine through the nominal position. The control signal which starts the braking process need not be delivered by the counter device as in the embodiment of the invention described above but may alternatively be derived from calculating mechanisms or cam discs if the latter are used.

In the embodiment of the invention described above in which a counter device is used, it is not absolutely necessary that the delivery of the counting pulses is resumed again always in a certain fixed position of the driving shaft, but this delivery may also be controlled by a timing device which delivers the control signal for starting the braking process in the first stroke at an instant which is the earlier the higher the stroke speed of the press. Also it is unnecessary to measure the stroke speed by counting the pulses which are delivered to the counter device within a fixed period of time. In fact it is also possible to determine the stroke speed by measuring the time within which a certain fixed number of pulses are delivered into the counter device.

The adjustment of the angular position of the driving shaft in which the braking process is started based on the measured stroke speed, need not necessarily be effected for the stroke during which the stroke speed is measured, although this will be the rule and also appears to be most suitable. The adjustment of the over-run movement can in fact be effected also during one of the subsequent strokes.

In one embodiment of the method according to the invention a device is provided which indicates the magnitude and sign of the difference by which the driving shaft deviates from the nominal position after the first press stroke, when the press has come to standstill.

This correction indicator can be connected with a signalling device which indicates when an adjustable correction value is exceeded. The fact that the correction value exceeds a certain magnitude indicates that the overrun movement has changed. This may be caused by, for example, wear of the brake, fluctuations of the pressure means for the brake or the like. Therefore, the magnitude of the necessary correction permits conclusions to be drawn relating to the state of the brake, when fluctuations of the compressed air or other effects are excluded. Obviously, the press may also be stopped altogether when a certain magnitude of this correction is attained or exceeded. In particular a conclusion relating to the state of the brake may be drawn from the indication of this correction value necessary for the first press stroke when the angular position of the driving shaft at which the braking process is started in the first press stroke, has been selected already in accordance with values found empirically or by calculation in such manner that the shaft ought to come to rest in the nominal position at the given stroke speed.

Figure 2:
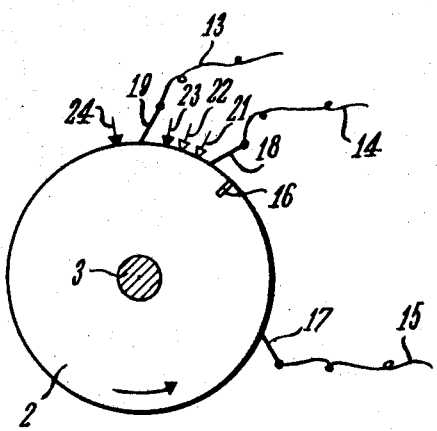
Figure 3:
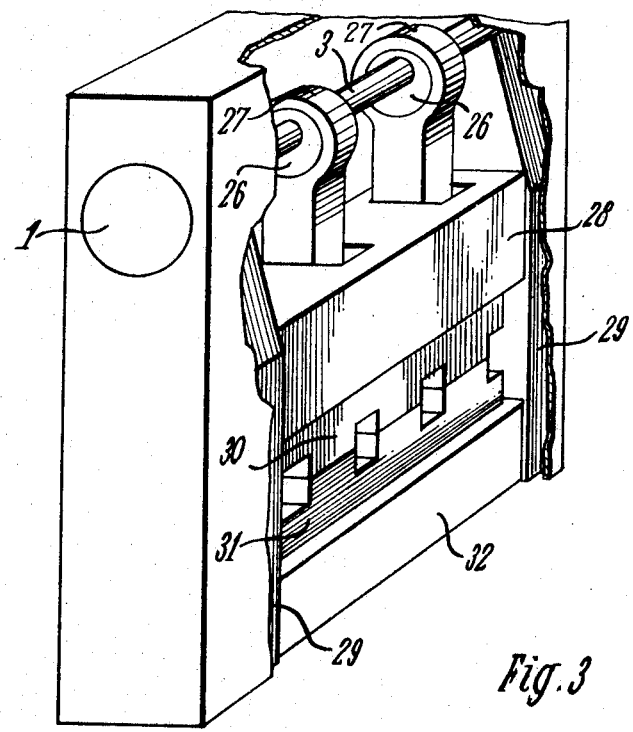
Figure 4:
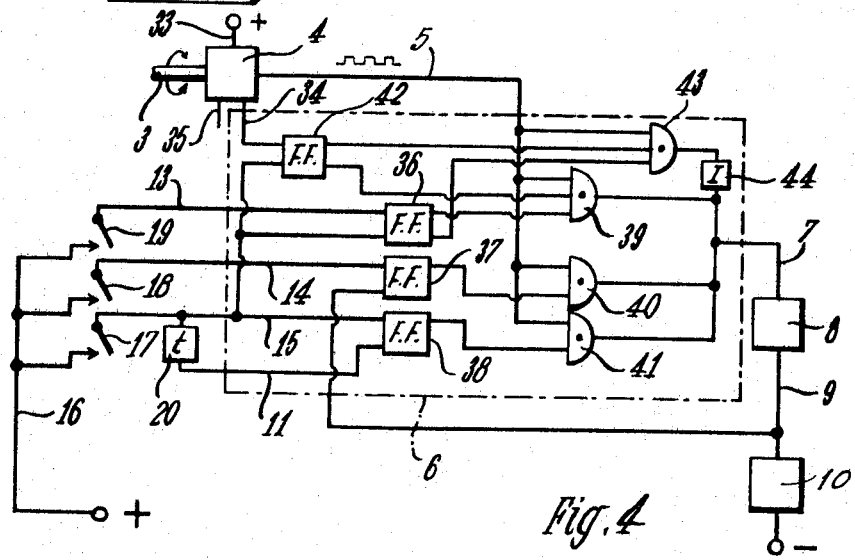

An embodiment of the invention is described below diagrammatically with reference to the accompanying drawings, in which:

FIG. 1 illustrates parts necessary for understanding the invention in conjunction with a block circuit diagram, FIG. 2 is a plan view of a detail illustrated in FIG. 1, FIG. 3 illustrates diagrammatically part of a press to which the invention may be applied, and FIG. 4 is a further block circuit diagram.

In the embodiment of the invention illustrated in the drawings, a flywheel 1 is driven by a motor 25, the flywheel 1 forming also the rotating driving part of a clutch the driven part of which is illustrated in the drawing by a disc 2. This disc 2 is keyed to a driving shaft 3 of a press and drives the cranks or eccentric members and the other links of the press, as well as also a pulse source 4, the latter under certain circumstances by way of suitable transmission means. The pulse source 4 may for example deliver approximately 5,000 pulses during each revolution of the press shaft 3 through a lead 5 to a control circuit 6. The output of this circuit 6 is connected by means of a lead 7 to a pulse counter device 8 which can be preset to a certain counted total; when the preset counted total of pulses is attained the clutch is released and a brake 10 is actuated through a lead 9. The circuit 6 moreover controls the feed of pulses from the source 4 to the counter 8 dependent upon control signals which arrive in the circuit 6 by way of the leads 11, 12, 13, 14 and 15.

The disc 2 carries one member 16 of a preferably contactless switching device which co-operates with other contact means, in the present case contactless switch elements 17, 18 and 19 which are disposed at stationary locations around the periphery of the disc 2 but which can be adjusted when required. The elements 17, 18, 19 are illustrated for convenience in the drawing as if they were contact springs or contact brushes which co-operate with a moving contact 16 disposed on the disc 2. The switch element 19 is disposed at a location in which it delivers a control signal to the lead 13 when the disc 2 and thus the driving shaft 3 are in the position in which the press is to come to a standstill (nominal position). The switch element 18 is disposed at a location in which it delivers a control signal to the lead 14 before the driving shaft 3 has attained the nominal position, and the switch element 17 delivers a control signal to the lead 15 when the driving shaft 3 is in an angular position in advance of the switch element 18 which is sufficient for measuring the stroke speed of the press within this angular range.

Considering the first of a series of working strokes, when the driving shaft passes through the position in which the switch member 16 produces a control signal at the switch element 17 this control signal starts a timing device 20 (FIG. 1) and makes the circuit 6 operative to pass the pulses arriving over the lead 5 to the counter device 8. After a certain period of time has expired the timing device 20 delivers by way of the lead 11 a control signal to the circuit 6 by which the passage of the pulses to the counter device 8 is interrupted. During this period of time 50 pulses for example may have been fed to the counter device 8, this being representative of the rotary speed of the driving shaft 3. Let it be assumed that the counter device has been preset for correct operation when 80 counting pulses have been fed to the counter device. After receiving 80 pulses the counter device 8 delivers through the lead 9 a control signal which causes the clutch to be released and the braking process to be started. In the present example only 50 pulses have been received so the brake is not yet engaged.

When during the further rotation of the disc 2 the switch member 16 travels past the switch element 18 a control signal delivered to the lead 14 by this switch element 18 causes the circuit 6 to pass the pulses again to the counter device 8. Since 50 counting pulses are stored already in this counter device the preset value 80 is attained after a further 30 pulses have been applied, whereupon a signal is sent through the lead 9 to operate the brake 10. The switch member 16 is for example located in the position indicated by the arrow 21 in FIGURE 2 when this signal is issued.

If however the speed of the driving shaft 3 is lower than just described, for example only 30 pulses instead of the 50 pulses may reach the counter 8 during operation of the timing device 20. After the control pulse from the lead 14 has made the circuit 6 receptive again for the pulses, a further 50 pulses must reach the counter device before it starts the braking process. The start of the braking process therefore is delayed until the disc 2 is for example located in the position indicated by the arrow 22.

Conversely if the speed of the shaft 3 is higher, less than 30 pulses are required at the counter 8 and the brake is brought into action in advance of the arrow 21. In each assumed case the shaft will in the normal case come to rest at or near the nominal position.

The present invention provides a correction if the nominal position should not be attained, by means of pulses from the pulse source 4 and control signals in the lead 12. Thus suppose the disc 2 and thus the driving shaft 3 attain the position illustrated by the arrow 23 in FIGURE 2 before the nominal position has been reached. In order to correct this deviation the pulse source 4 or another member connected to the driving shaft 3 is provided with a start-stop signal device which delivers a control signal into a control lead 12 at the start of rotation and at the end of rotation of the shaft 3. When a control signal which corresponds to the beginning of a rotation of the shaft 3 arrives through the lead 12 in the circuit 6 and if at this instant a control signal indicating that the nominal position of the shaft 3 has been attained has not yet arrived in the circuit 6 through the control lead 13 from the contact element 19 which condition thus corresponds to a disc 2 which has come to rest at the arrow position 23, pulses arriving in the lead 5 from this instant onwards are applied as control correction pulses to the counter device 8 in such manner as to increase the preset number. This is continued until a control signal arrives on the lead 13 indicating that the nominal position has been attained. If such pulses are received by the counter 8 the preset number has been increased to 90 from the previous assumed value of 80 so that the brake operating signal in line 9 is correspondingly delayed and at the second stroke the disc 2 comes to standstill closer to or at the nominal position, provided that the overrun movement, that is to say the angular distance between the arrows 21 or 22 and the arrow 23 or the switch element 19 is the same for two successive strokes which however should always be the case.

If conversely at the first stroke the disc 2 comes to standstill in the position indicated by the arrow 24 the operation of the brake must occur at an earlier instant at the next stroke. As the disc 2 comes to rest it passes the switch element 19 which allows control correction pulses to pass from the lead 5 to the counter 8 until the start-stop signal in the lead 12 indicates that the shaft 3 has stopped. Thereby, for example, 10 pulses may have been fed to the counter device 8 in such manner as to reduce the existing total. At the following second stroke therefore only 70 pulses can be fed into the counter device before the braking process is started. Braking is therefore started earlier by the difference between the nominal position and the position of the arrow 24.

FIG. 3 illustrates diagrammatically the relationship between the shaft 3 and the position of a press ram 28. The shaft 3 carries eccentrics 26 on which in turn connecting rods 27 are mounted which are pivotally attached to the press ram 28. The press ram 28 is guided in lateral guides 29. Tools 30 which cooperate with counter tools 31 on a press table 32 are attached to the underside of the ram 28. Obviously, the invention can be applied to any other type of press for which it is important that after each individual stroke the ram comes to a standstill in a quite definite position, for example at the upper dead point.

FIG. 4 illustrates by way of example one embodiment of the circuit 6, which also can be constructed in various ways. The important point is only that it performs the prescribed functions. In the embodiment of FIG. 4 a pulse source 4 of well-known type delivers pulses of equal duration and equal amplitude to the lead 5 when the shaft 3 rotates with a given total number of pulses for each revolution. The pulse source 4 has an input 33 for an operating voltage, an output for the pulses on the lead 5 and additionally an output 34 at which a signal appears only when the shaft 3 is rotating, thus providing a start-stop signal. A further output 35 may provide a stop signal when the shaft 3 stops rotating, but this output 35 is not used in the embodiment of the circuit 6 illustrated in FIG. 4. However, other embodiments of the circuit 6 are possible in which the output 35 indicating the end of the rotary movement of the shaft 3 is used.

For reasons of clarity the switching means 16, 17, 18, 19 are illustrated in FIG. 4 in such manner that the contact member 16 is connected to a control voltage and moves past the switch elements 17, 18, 19 to deliver a short pulse to the leads 15, 14, 13 whenever the switch elements 17, 18, 19 are engaged. In practice however contactless switching devices are used for this purpose. Each of the leads 13, 14, 15 is connected to the "set" input of one of a number of bistable circuits 36, 37 and 38. The outputs of these bistable circuits 36, 37 and 38 are connected to AND-gate circuits 39, 40 and 41, respectively. The "reset" input of the bistable circuit 38 is connected by means of a lead 11 to a time delay device 20 which in turn is connected to the lead 15 so that the bistable circuit 38 is reset again after a period has expired which can be preset in the time delay device 20. The other input of the AND-gate circuit 41 is connected to the lead 5. When the contact member 16 moves past the switch element 17 the short pulse in the lead 15 sets the bistable circuit 38 and starts the timing device 20. The pulses delivered by the pulse source 4 in the lead 5 now pass through the AND-gate circuit 41 into the lead 7 and advance the counter device 8 until the time delay device 20 delivers a reset pulse to the lead 11 and to the reset input of the bistable circuit 38 whereby this circuit is reversed and cuts off the AND-gate circuit 41.

When the contact member 16 and the switch element 18 produce a pulse in the lead 14 the bistable circuit 37 is set and the AND-gate circuit 40 also connected to the lead 5 passes pulses from the lead 5 to the counter device 8 by way of the lead 7. When the counter device 8 attains the preset counted total the counter device 8 delivers by way of the lead 9 a signal to a brake operating device 50 so that the braking process is initiated. The lead 9 is also connected to the reset input of the bistable circuit 37 so that this circuit is also reset and the AND-gate circuit 40 is cut off.

Correction of the shaft stops at the arrow position 24 is obtained as follows: the output 34 of the pulse source 4 at which the start-stop signal appears which signal registers the rotation of the shaft 3, is connected to the set input of a bistable circuit 42 the normal output of which is connected to an input of an AND-gate circuit 43 and an inverse output of which is connected to an input of the AND-gate circuit 39. A further input to the AND-gate circuits 39 and 43 is connected to the lead 5 carrying the counting pulses. Thus when the bistable circuit 36 is set by a signal on the lead 13 produced by the contact member 16 and the switch element 19 because the shaft is moving past the nominal position, a signal appears at its normal output and if at this instant a signal has not yet appeared on the lead 34, indicating that the shaft 3 is still rotating, the AND-gate circuit 39 still receives a signal from the bistable circuit 42 and hence the counting pulses from the lead 5 pass to the lead 7 and thence to the counter device 8, which consequently registers a number of pulses which reduce the number of pulses available before the brake operating device 50 is actuated at the next operation of the press. The AND-gate 39 is closed by the bistable circuit 42 when the shaft stops. The reset input of the bistable circuits 36 and 42 are connected to the lead 15 so that these bistable circuits are reset when the contact member 16 and the switch element 17 produce a pulse during the next stroke. If conversely the shaft stops at the arrow position 23 a start signal in the lead 34 at the next operation of the press operates the bistable circuit 42 the normal output of which is fed to the gate 43 which also receives a signal from the inverse output of the bistable circuit 36.

Hence the AND-gate circuit 43 is conductive for the counting pulses on the lead 5 which then however are reversed by means of an inverting circuit 44 so that they are not added to, but subtracted from the pulse content of the counter device 8. In many cases it will be simpler to connect the output of the AND-gate circuit 43, without the use of an inverting circuit 44, directly to a second input of the counter device 8 which is then constructed so that pulses arriving at the second input are counted negatively by the counter device.

Preferably the correction pulses transmitted to the counter 8 through the gates 39 or 43 are applied in such a way as to adjust or modify the preset number on the counter so that once a correction has been effected this is represented by a new preselection of that number which is thus operative until a further correction becomes necessary. For this purpose the magnitude and sign of the required correction can be shown on an indicator for registering the amount of correction necessary so that the preset adjustment can be appropriately modified either manually or by automatic control means. Further, a signalling device may be operated by the correction pulses which gives an additional indication or warning drawing attention to the requirement for correction of the preset value.

The construction of the bistable circuits, AND-gate circuits, timing device, inverting circuit, counter device and brake operating device referred to above are well-known to experts operating in the field, and a more detailed description of the respective constructions is therefore thought to be unnecessary.

Thus, by the counter 8 the control correction pulses corresponding to the movement between arrow 23 and contact element 19 or between element 19 and arrow 24 are added to or subtracted from the preset number in the manner already described, so that the shaft 3 comes to standstill in the nominal position at the next stroke. If the arrangement includes an above mentioned device, which displays the number of correction pulses, the preset number of the counter may be corrected by hand or by adding or subtracting the displayed number of correction impulses respectively to or from the preset number. However, such a correction by hand of the preset number of the counter 8 is not necessary, if the correction pulses are directly used to change the preset number of the counter 8. To this end the outputs of the AND-gates 43 and 39 may be connected, if an inverter 44 is provided, with a supplementary input or, if no inverter is present, with two supplementary inputs of the counter 8. Then, at the beginning of the second count and all the following counts and press strokes, the counter 8 is no long preset on the above metioned 80 pulses but, for example, on 90 or 70 pulses, so that a further correction will become necessary only when the overrun-movement of the press shaft 3 will change.

What we claim is:

1. A method for stopping a rotating shaft in a predetermined angular position by means of a braking device, comprising causing a continuous series of signal pulses to be produced by the rotating shaft, counting the number of pulses produced during a definitive period of time, comparing the said counted number with a preselected number of pulses and using the difference between said numbers for automatically determining the angular position of the shaft at which the braking device is made operative to stop the shaft in the predetermined position.

2. A method for adjusting the over-run movement of the main driving shaft of a press occurring when the press is stopped by means of a braking device, comprising measuring the stroke speed of the press, using the result of the measurement to determine the angular position of the shaft at which said braking device must be made operative, thereby to stop the shaft in a predetermined angular position thereof, and further measuring the magnitude and sign of any difference between the actual stopping position of the shaft and the predetermined angular position for correcting the angular position of the shaft in which said braking device is made operative at a subsequent stroke of the press.

3. A method as claimed in claim 2, comprising causing a continuous series of signal pulses to be produced by the rotating shaft, counting the number of pulses produced during a definite period of time, utilising the number so counted for determining the angular position of the shaft in which the said braking device must be made operative to stop said shaft in a predetermined angular position thereof, and further causing pulses to be produced in accordance with any angular difference between the actual stopping position and said predetermined position of said shaft, said latter pulses being utilised for correcting the angular position of said shaft in which said braking device is made operative at future strokes.

4. Apparatus for adjusting the angular position of a rotating shaft at which said shaft is caused to stop, the apparatus comprising
   shaft driving means selectively connected to said shaft for driving said shaft in rotation,
   braking means for selectively stopping rotation of said shaft at a desired stop position,
   speed determining means for determining the rotary speed of said shaft including a pulse source producing a number of pulses at a frequency in proportion to the rotary speed of said shaft, counter means for providing a control signal to actuate said braking means upon reaching a predetermined count of pulses from said pulse source, control means for selectively connecting said pulse source to said counter means, and timing means for actuating said control means for a first period of time of given length during which a number of pulses less than said predetermined count are applied to said counter means in accordance with the speed of said shart, and
   regulating means for actuating said control means to connect said pulse source to said counter means during a second period of time beginning when said shaft reaches a predetermined position after said first period of time and ending with generation of said control signal.

5. Apparatus as defined in claim 4, wherein said shaft is part of a press having a frame and a press ram displaceable in said frame through rotation of said shaft, said apparatus serving to stop said shaft in an exactly defined stop position.

6. Apparatus as defined in claim 5, further including adjusting means for adjusting the said predetermined count of said counter means in accordance with the magnitude and sign of any difference between the actual position at which said shaft stops and said stop position.

7. Apparatus as defined in claim 4 wherein said regulating means includes first switch means operated by said shaft for providing an actuate signal to operate said control means when said shaft reaches said predetermined position.

8. Apparatus as defined in claim 7 wherein said timing means includes a timer generating a signal de-activating said control means after expiration of said first period of time of given length and second switch means operated by said shaft for actuating said timer when said shaft reaches a given position prior to said predetermined position.

9. Apparatus as defined in claim 8 further including adjusting means for adjusting the said predetermined count in said counter means in accordance with the magnitude and sign of any difference between the actual position at which said shaft stops and said stop position.

10. Apparatus as defined in claim 9, wherein said speed determining means further includes means for generating a stop signal upon detecting the stopping of said shaft and said adjusting means further includes third switch means producing a start signal when said shaft reaches said desired stop position overtravel means responsible to said start signal prior to receipt of said stop signal for connecting said pulse source to said counter means until said stop signal is received to reduce said predetermined count.

11. Apparatus as defined in claim 10 wherein said adjusting means further includes undertravel means responsive to receipt of said stop signal prior to receipt of said start signal for increasing said predetermined count by an amount equal to the number of pulses generated by rotation of said shaft from its actual stop position until said start signal is generated.

12. Apparatus as defined in claim 11 wherein said first, second and third switch means include an individual contact adjustably fixed in position with respect to said shaft and a common contact member mounted on said shaft for engaging said individual contacts successively during rotation of said shaft whereby a first signal is emitted in a position at which the measurement of the stroke speed is to start, a second signal is emitted in a position at which the number of pulses remaining in the counter is to start for the purpose of determining, on termination of the count, the point at which the brake is brought into operation, and a third signal is emitted in the said nominal position of the shaft.

13. Apparatus for adjusting the angular position of a rotating shaft at which said shaft is caused to stop, the apparatus comprising
- a pulse source coupled to said shaft for providing a number of pulses at a frequency in proportion to the speed of rotation of said shaft,
- a pulse counter for counting pulses from said pulse source up to a predetermined count,
- control means for selectively connecting said pulse source to said pulse counter,
- timing means for actuating said control means during a fractional portion of one cycle of rotation of said shaft to provide a count in said counter less than said predetermined count which is proportional to the speed of rotation of said shaft,
- braking means responsive to said pulse counter reaching said predetermined count for stopping rotation of said shaft, and
- means for automatically adjusting the angular spacing between the position of said shaft at which the braking process is started and the position at which the shaft is to come to a standstill in accordance with a predetermined function of the measured speed of said shaft.

14. Apparatus as defined in claim 13 wherein said predetermined function of the measured speed is constituted by a proportional dependence upon the speed of the shaft.

15. Apparatus as defined in claim 13 wherein said predetermined function of the measured speed is constituted by an empirical dependence upon the speed of the shaft.

References Cited

UNITED STATES PATENTS

| | | | |
|---|---|---|---|
| 2,287,002 | 6/1946 | Moseley | 318—28 |
| 3,035,215 | 5/1962 | De Viney | 318—448 X |
| 3,283,230 | 11/1966 | Davies et al. | 318—18 |
| 3,353,161 | 11/1967 | Toscano | 318—162 |
| 2,699,226 | 1/1955 | Bruns | 187—29 |

FOREIGN PATENTS

| | | |
|---|---|---|
| 639,817 | 7/1950 | Great Britain. |

ORIS L. RADER, Primary Examiner

L. L. HEWITT, Assistant Examiner

U.S. Cl. X.R.

318—369, 466